(12) United States Patent
Liu et al.

(10) Patent No.: US 12,704,876 B2
(45) Date of Patent: Aug. 11, 2026

(54) DISPLAY DEVICE

(71) Applicant: BOE Technology Group Co., Ltd., Beijing (CN)

(72) Inventors: Junhuan Liu, Beijing (CN); Hong Zhu, Beijing (CN); Youqing Shen, Beijing (CN); Zihan Gao, Beijing (CN); Xuan Tao, Beijing (CN); Yanli Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 130 days.

(21) Appl. No.: 18/854,551

(22) PCT Filed: Feb. 7, 2024

(86) PCT No.: PCT/CN2024/076562
§ 371 (c)(1),
(2) Date: Oct. 7, 2024

(87) PCT Pub. No.: WO2024/193261
PCT Pub. Date: Sep. 26, 2024

(65) Prior Publication Data

US 2025/0355464 A1 Nov. 20, 2025

(30) Foreign Application Priority Data

Mar. 23, 2023 (CN) ......................... 202310293466.4

(51) Int. Cl.
*G06F 1/16* (2006.01)

(52) U.S. Cl.
CPC .......... *G06F 1/1624* (2013.01); *G06F 1/1652* (2013.01)

(58) Field of Classification Search
CPC ............................... G09F 9/301; G06F 1/1652
See application file for complete search history.

(56) References Cited

U.S. PATENT DOCUMENTS

| | | | | |
|---|---|---|---|---|
| 9,399,391 | B2 * | 7/2016 | Bernardo | B60J 7/085 |
| 9,694,234 | B2 * | 7/2017 | Dalebout | A63B 22/02 |
| 12,144,132 | B2 * | 11/2024 | Gao | G06F 1/1652 |
| 12,457,885 | B2 * | 10/2025 | Liu | H10K 77/111 |
| 12,575,042 | B2 * | 3/2026 | Wang | G06F 1/1652 |

(Continued)

FOREIGN PATENT DOCUMENTS

| | | |
|---|---|---|
| CN | 108230937 A | 6/2018 |
| CN | 108259649 A | 7/2018 |

(Continued)

*Primary Examiner* — Adrian S Wilson
(74) *Attorney, Agent, or Firm* — XSENSUS LLP

(57) ABSTRACT

Provided is a display device. The display device includes: a flexible display panel and a support structure, the flexible display panel being disposed on a side of the support structure, and the support structure including a plurality of support members arranged in parallel; wherein the support member includes a support strip and two sliding parts; wherein the two sliding parts are respectively disposed at two ends of the support strip, and at least a portion of the sliding part extends beyond the support strip in a length direction of the support strip; the support strip and the sliding parts are made of different materials; and a first connecting structure is disposed at each of two ends of the support strip, and the sliding part includes a second connecting structure.

20 Claims, 9 Drawing Sheets

(56) References Cited

U.S. PATENT DOCUMENTS

| | | | | |
|---|---|---|---|---|
| 2016/0147261 | A1 | 5/2016 | Bohn et al. | |
| 2023/0176624 | A1* | 6/2023 | Kim | G06F 1/1637 |
| 2024/0085956 | A1* | 3/2024 | Zhu | G06F 3/016 |
| 2024/0310876 | A1* | 9/2024 | Zhao | G06F 1/1656 |
| 2026/0006731 | A1* | 1/2026 | Lei | B60K 35/223 |

FOREIGN PATENT DOCUMENTS

| | | | |
|---|---|---|---|
| CN | 111866236 | A | 10/2020 |
| CN | 114550592 | A | 5/2022 |
| CN | 114633497 | A | 6/2022 |
| CN | 115527449 | A | 12/2022 |
| CN | 219828441 | U | 10/2023 |
| WO | 2021185096 | A1 | 9/2021 |
| WO | 2022000320 | A1 | 1/2022 |

* cited by examiner

DISPLAY DEVICE

CROSS-REFERENCE TO RELATED APPLICATIONS

The present disclosure is a U.S. national phase application based on PCT/CN2024/076562, filed on Feb. 7, 2024, which claims priority to Chinese Patent Application No. 202310293466.4, filed on Mar. 23, 2023, and entitled "DISPLAY DEVICE", the contents of each are incorporated herein by reference in its entirety.

TECHNICAL FIELD

Embodiments of the present disclosure relate to the field of display technology, and in particular, relate to a display device.

BACKGROUND

With the development of technology, display devices are applied more and more widely and have become one of the important tools in people's daily work and life. Slidable and rollable display devices are very popular among the public because they are easy to carry and have a large display area.

SUMMARY

The embodiments of the present disclosure provide a display device. The technical solutions are as follows.

According to some embodiments of the present disclosure, a display device is provided. The display device includes a flexible display panel and a support structure, the flexible display panel is disposed on a side of the support structure, and the support structure includes a plurality of support members arranged in parallel; wherein the support member includes a support strip and two sliding parts; wherein the two sliding parts are respectively disposed at two ends of the support strip, and at least a portion of the sliding part extends beyond the support strip in a length direction of the support strip; the support strip and the sliding parts are made of different materials; a first connecting structure is disposed at each of two ends of the support strip, and the sliding part includes a second connecting structure; wherein the first connecting structure and the second connecting structure are recessed and protruding structures matching each other, and the support strip and the sliding part are connected by the first connecting structure and the second connecting structure.

In some embodiments, one of the first connecting structure and the second connecting structure includes N protruding structures, and the other one of the first connecting structure and the second connecting structure includes N recessed structures, wherein N is a positive integer.

In some embodiments, the protruding structure is a cylinder, a truncated pyramid, a circular truncated cone, a dovetail table, or a truncated pyramid, and a center line of the protruding structure is perpendicular to the length direction of the support strip and a width direction of the support strip.

In some embodiments, the protruding structure has a first surface and a second surface opposite to each other and a sidewall connecting the first surface and the second surface; wherein the first surface is connected to a bearing surface of the protruding structure, and an angle between the second surface and the sidewall ranges from 10° to 80°.

In some embodiments, a dimension of the protruding structure in a thickness direction of the support strip ranges from 0.1 mm to 1 mm; and a dimension of the recessed structure in the thickness direction of the support strip ranges from 0.1 mm to 1 mm.

In some embodiments, N is greater than 1, and the N protruding structures are spaced apart in the length direction of the support strip, and a distance between two adjacent protruding structures of the N protruding structures is greater than or equal to 0.2 mm.

In some embodiments, the N protruding structures are of the same shape; or at least two protruding structures of the N protruding structures are of different shapes.

In some embodiments, the sliding part includes a sliding base and a columnar protrusion; wherein an orthographic projection of the sliding base on a first surface of the support strip is within the first surface of the support strip, and the first surface of the support strip is a surface on which the first connecting structure is located; in the length direction of the support strip, the columnar protrusion is disposed on a side of the sliding base away from the support strip.

In some embodiments, a dimension of the sliding base in the length direction of the support strip ranges from 0.3 mm to 3 mm; and a ratio of a dimension of the sliding base in a width direction of the support strip to a width of the support strip ranges from 0.5 to 1.5.

In some embodiments, the sliding part further includes a limiting member, and the limiting member is configured to limit movement of the support member in the width direction of the support strip; wherein in the length direction of the support strip, the limiting member and the columnar protrusion are disposed on a same side of the sliding base.

In some embodiments, the support strip is a non-hollowed-out structure; or the support strip is provided with at least two strip grooves, wherein the strip groove passes through the support strip in a thickness direction of the support strip, a length direction of the strip groove is the same as the length direction of the support strip, and the at least two strip grooves are arranged along the length direction of the support strip.

In some embodiments, a length of the strip groove is greater than 0 and is less than a half of a length of the support strip.

In some embodiments, a width of the support strip ranges from 0.5 mm to 100 mm.

In some embodiments, the support strip and the sliding part are made of different materials, and at least one of the support strip and the sliding part is a non-metal structure member.

In some embodiments, the support strip is a carbon fiber structure member, and the sliding part is a metal structure member, a resin structure member or a plastic structure member.

In some embodiments, the support strip includes at least three carbon fiber material layers that are sequentially stacked, wherein two adjacent carbon fiber material layers of the at least three carbon fiber material layers have different carbon fiber direction orientations.

In some embodiments, in the at least three carbon fiber material layers, a carbon fiber direction orientation of a carbon fiber material layer disposed in an odd number layer is a first carbon fiber direction orientation, and a carbon fiber direction orientation of a carbon fiber material layer disposed in an even number layer is a second carbon fiber direction orientation, wherein the first carbon fiber direction orientation and the second carbon fiber direction orientation intersect.

In some embodiments, the plurality of support members include a plurality of first support members and one second support member; wherein in an arrangement direction of the plurality of first support members, the second support member is disposed on a side of the plurality of first support members; and a width of a support strip of the first support member is less than a width of a support strip of the second support member.

In some embodiments, the support structure further includes a plurality of first support parts; wherein at least one of the plurality of first support parts is disposed on sides, away from the flexible display panel, of at least some of the support strips, and at least one of the plurality of first support parts connected to a same support strip is symmetric about a center line of the support strip, wherein the center line is perpendicular to the length direction of the support strip.

In some embodiments, the support structure further includes a plurality of second support parts; wherein at least one of the plurality of second support parts is disposed between two adjacent support strips, and the at least one of the plurality of second support parts disposed between the two adjacent support strips is symmetric about a center line of the support strip, wherein the center line is perpendicular to the length direction of the support strip

DETAILED DESCRIPTION

To make the objects, technical solutions and advantages of the present disclosure clearer, the embodiments of the present disclosure are further described in detail hereinafter with reference to the accompanying drawings.

The terms in the section of the detailed description of the present disclosure are merely used for the purpose of explaining the embodiments of the present disclosure, and are not intended to limit the present disclosure. Unless otherwise defined, the technical terms or scientific terms used in the embodiments of the present disclosure shall be taken to mean the ordinary meanings as understood by those of ordinary skill in the art to which the present disclosure belongs. The terms "first," "second," "third," and similar terms used in the description and claims of the present disclosure do not denote any order, quantity, or importance, but rather are merely used to distinguish different components. Similarly, the singular forms "an," "a," and "the" are not intended to limit the number but include both singular and plural referents. The term "include" or "comprise" and similar terms are intended to mean that the element or object before "include" or "comprise" covers the elements or objects or equivalents listed after "include" or "comprise," without excluding other elements or objects.

Currently, a slidable and rollable display device includes a flexible display panel and a support structure supporting the flexible display panel. The support structure includes a plurality of support members arranged in parallel, the support member includes a support strip and sliding parts disposed at both ends of the support strip, and the support strip and the sliding parts are integrally formed of a metal material.

Figure 1:
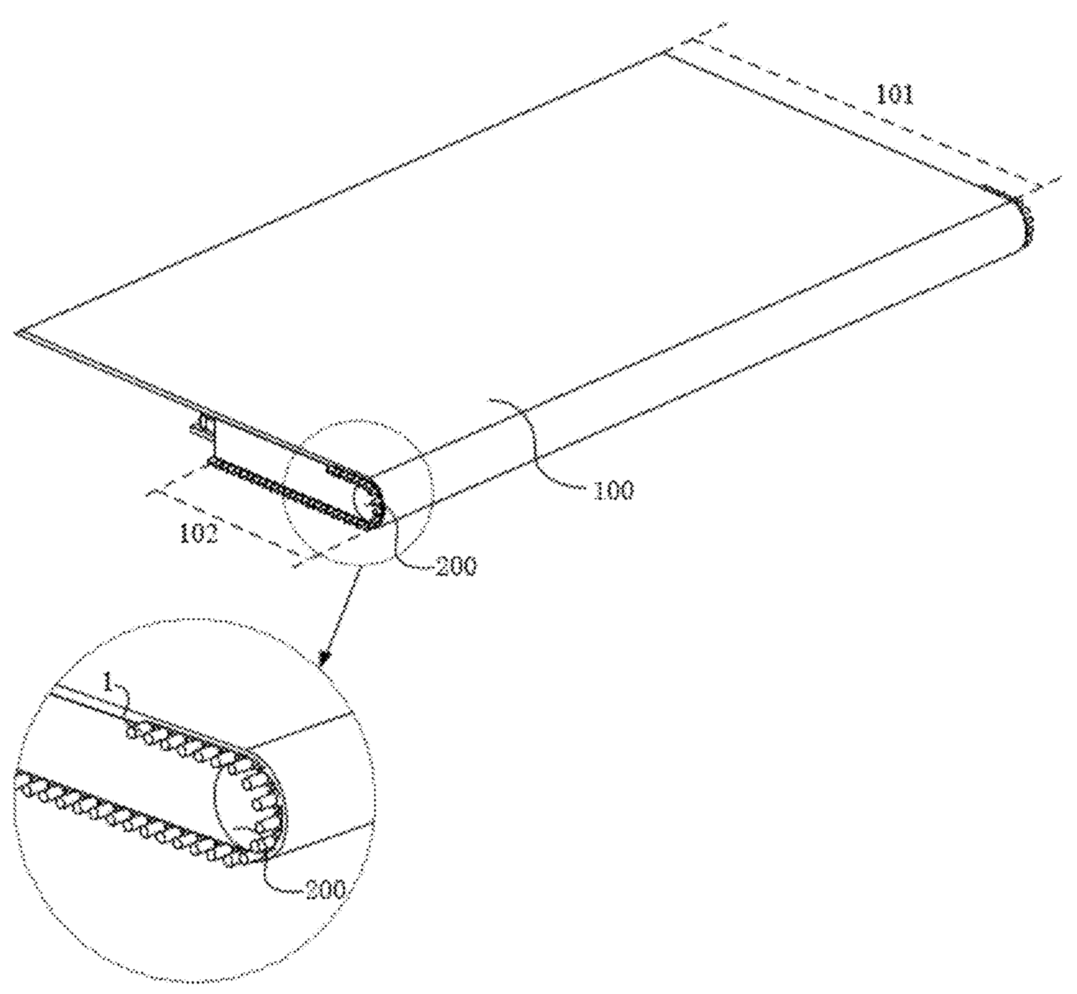
FIG. 1 is a schematic structural diagram of a display device according to some embodiments of the present disclosure.

FIG. 1 is a schematic structural diagram of a display device according to some embodiments of the present disclosure. As shown in FIG. 1, the display device includes a flexible display panel 100, a support structure, a guide rail 300 (shown in FIG. 15), and a scroll 200. The flexible display panel 100 includes a planar display portion 101 and a rollable display portion 102, and the flexible display panel 100 has a display surface and a non-display surface that are opposite to each other.

The support structure includes a non-light-emitting side that is disposed on and always distributed on the rollable display portion 102 of the flexible display panel 100. The scroll 200 is disposed on the non-display surface of the flexible display panel 100, and the rollable display portion 102 of the flexible display panel 100 is scrollably wound on the scroll 200. When the rollable display portion 102 of the flexible display panel 100 slides along the scroll 200, the support structure can effectively support the rollable display portion 102 of the flexible display panel 100 that is scrollably wound on the scroll 200, to prevent the flexible display panel 100 from a greater extent of defects such as warping during the sliding and rolling process. Therefore, a better overall flatness of the flexible display panel 100 is ensured, thereby ensuring a better display effect of the display device.

Figure 2:
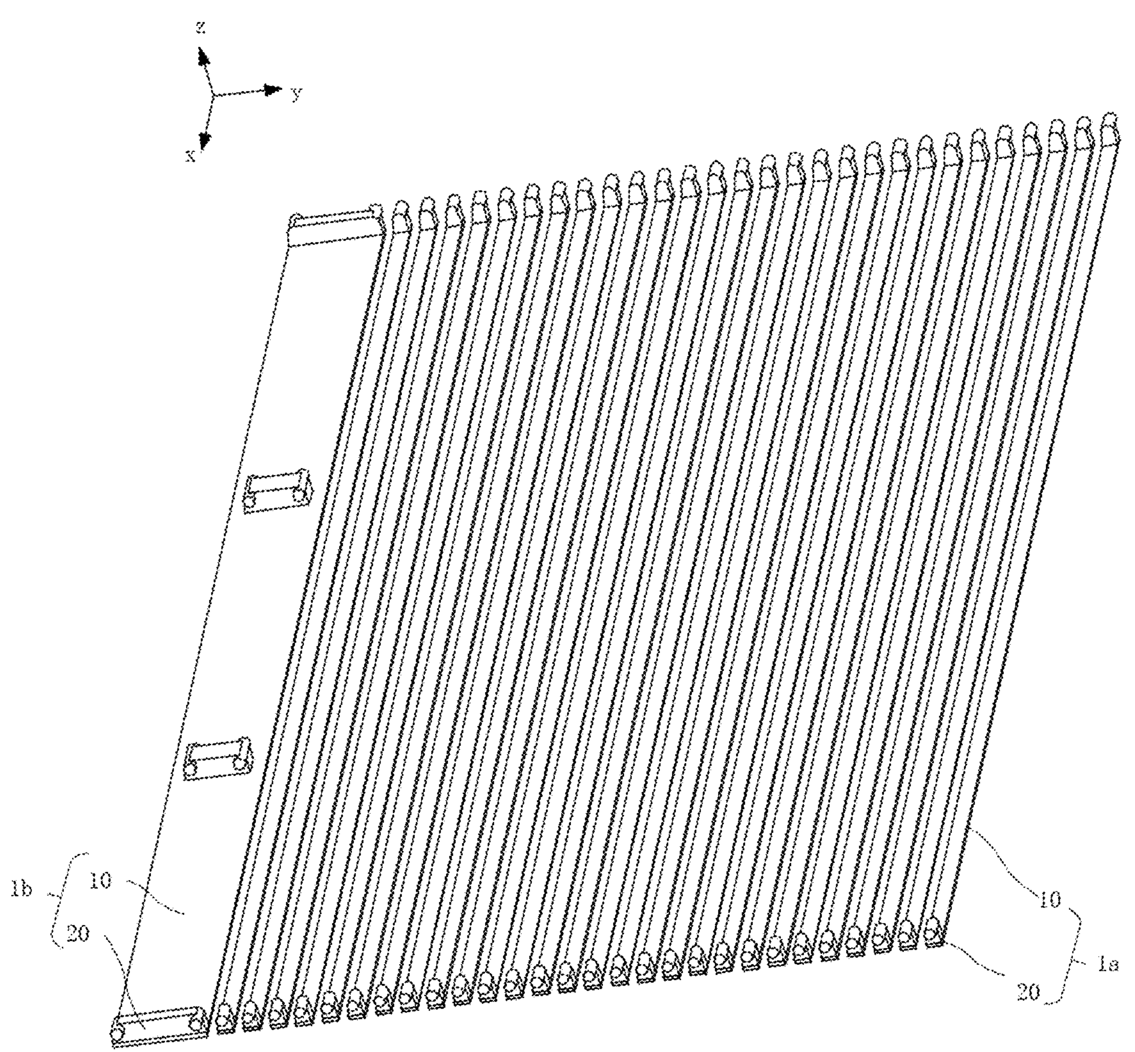
FIG. 2 is a schematic diagram of a support structure according to some embodiments of the present disclosure.
Figure 3:
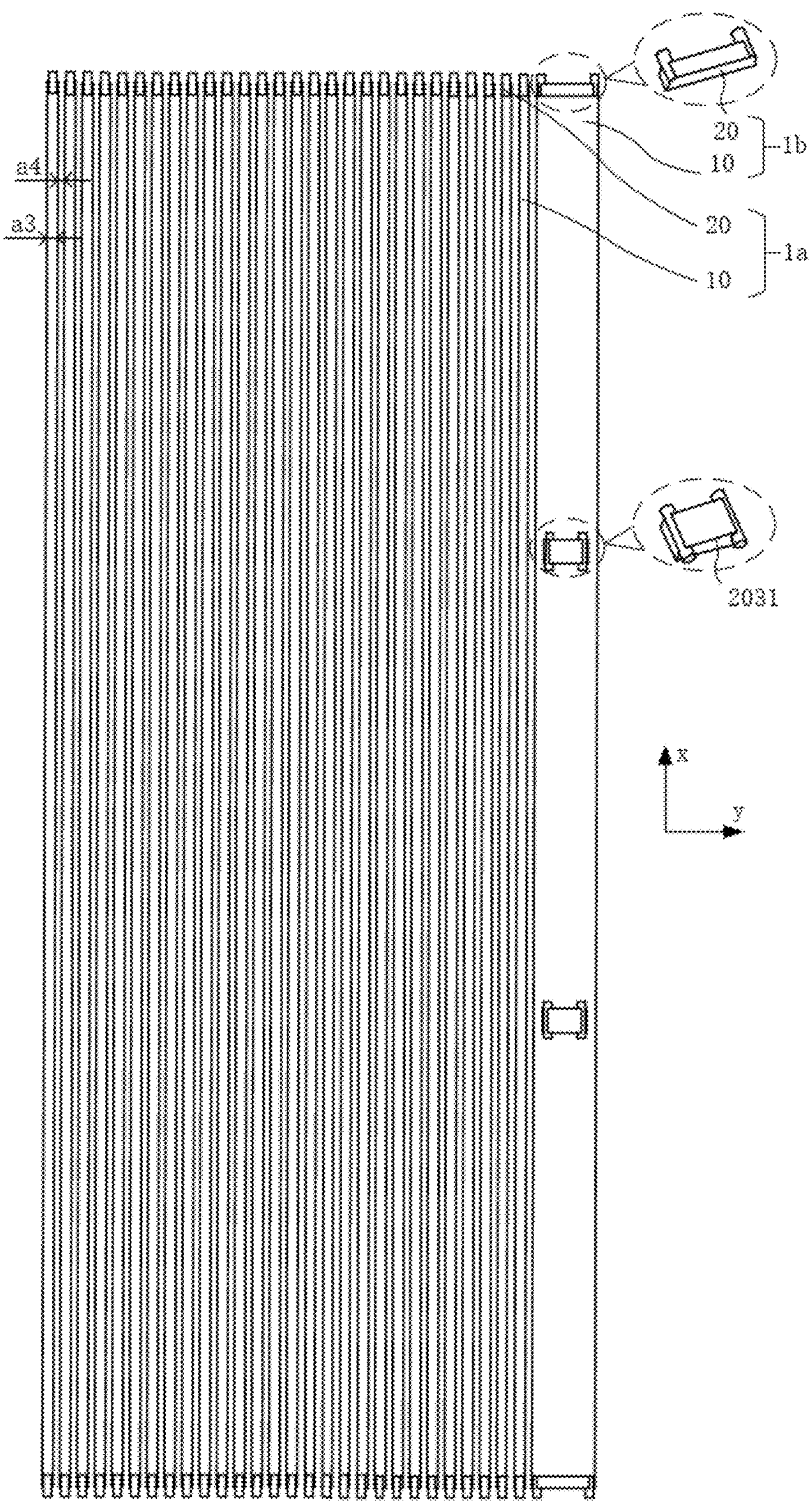
FIG. 3 is a top view of the support structure shown in FIG. 2.

FIG. 2 is a schematic diagram of a support structure according to some embodiments of the present disclosure, and FIG. 3 is a top view of the support structure shown in FIG. 2. As shown in FIG. 2 and FIG. 3, the support structure includes a plurality of first support members 1*a*, and the plurality of first support members 1*a* are arranged in parallel.

The first support member 1*a* includes a support strip 10 and two sliding parts 20. The two sliding parts 20 are respectively disposed at two ends of the support strip 10, and at least a portion of the sliding part 20 extends beyond the support strip 10 in the length direction x of the support strip 10. The support strip 10 and the sliding part 20 are made of different materials. The side of the support strip 10 away from a sliding base is coupled to the flexible display panel to play a function of supporting the flexible display panel.

Figure 4:
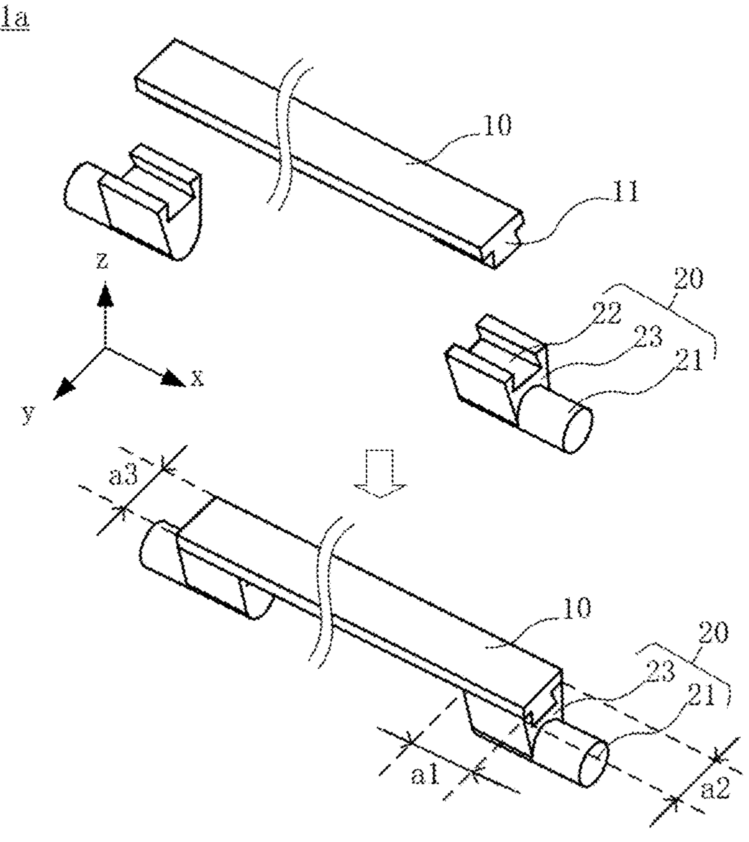
FIG. 4 is a schematic structural diagram of a first support member according to some embodiments of the present disclosure.

FIG. 4 is a schematic structural diagram of a first support member according to some embodiments of the present disclosure. As shown in FIG. 4, in the embodiments of the present disclosure, a first connecting structure 11 is disposed at each of the two ends of the support strip 10, and the sliding part 20 includes a second connecting structure 22. The first connecting structure 11 and the second connecting structure 22 are recessed and protruding structures matching each other, and the support strip 10 and the sliding part 20 are connected by the first connecting structure 11 and the second connecting structure 22. The protrusion structure in first connecting structure and the recessed structure in second connecting structure can increase the connecting area between the support strip and the sliding part, thereby achieving a reliable connection between the support strip and the sliding part to form the support member.

In the embodiments of the present disclosure, as shown in FIG. 4, the sliding part 20 includes a sliding base 23 and a columnar protrusion 21, and the orthographic projection of the sliding base 23 on a first surface of the support strip 10 is within the first surface of the support strip 10. The first surface of the support strip 10 is a surface on which the first connecting structure 11 is located. In the length direction x of the support strip 10, the columnar protrusion 21 is disposed on the side of the sliding base 23 away from the support strip 10. The sliding base 23 bears the second connecting structure 22 and the columnar protrusion 21.

In the embodiments of present disclosure, as shown in FIG. 4, the dimension a1 of the sliding base 23 in the length direction x of the support strip 10 ranges from 0.3 mm to 3 mm, e.g., 0.3 mm, 0.8 mm, 1.5 mm, 2 mm, and 3 mm.

In the embodiments of the present disclosure, as shown in FIG. 4, the ratio of the dimension a2 of the sliding base 23 in the width direction y of the support strip 10 to the width a3 of the support strip 10 ranges from 0.5 to 1.5. For example, the ratio is 0.8 to 1.2. Exemplarily, the ratio is 1.

Exemplarily, in the support member shown in FIG. 4, the first connecting structure 11 includes a protruding structure in the shape of a dovetail table, and the second connecting structure 22 includes a recessed structure of a corresponding shape.

Figure 5:
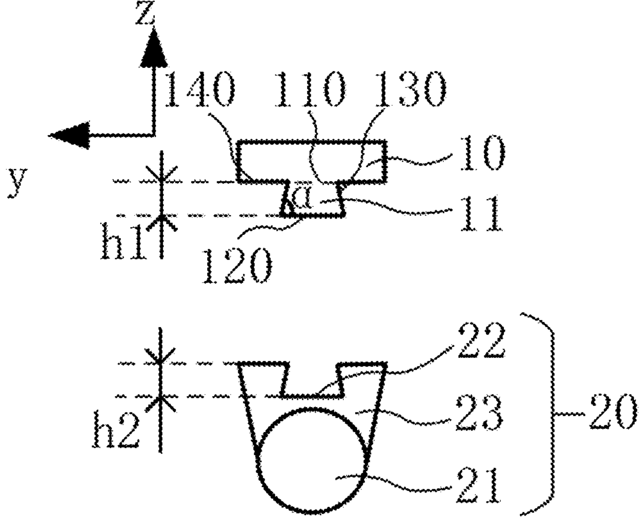
FIG. 5 is a side view of the first support member shown in FIG. 4.

FIG. 5 is a side view of the first support member shown in FIG. 4. As shown in FIG. 4 and FIG. 5, the protruding structure has a first surface 110 and a second surface 120 opposite to each other and a sidewall 130 connecting the first surface 110 and the second surface 120. The first surface 110 is connected to the bearing surface 140 of the protruding structure. The angle $\alpha$ between the second surface 120 and the sidewall 130 ranges from 100 to 80°, e.g., 30° to 60°. The bearing surface 140 of the protruding structure is a surface connecting the protruding structure and the first connecting structure including the protruding structure.

Figure 6:
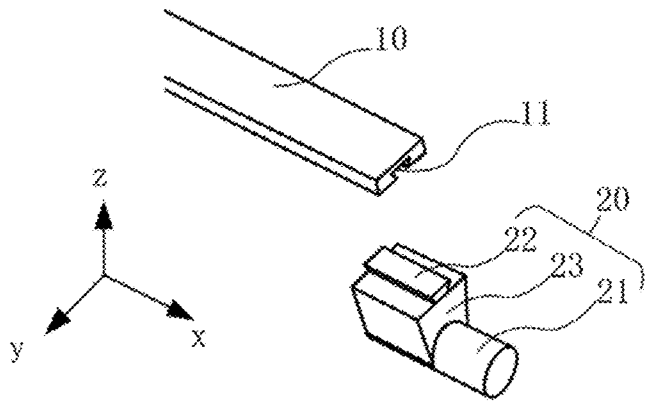
FIG. 6 is a schematic structural diagram of another first support member according to some embodiments of the present disclosure.

FIG. 6 is a schematic structural diagram of another first support member according to some embodiments of the present disclosure. The support member shown in FIG. 6 differs from the first support member shown in FIG. 4 in that the first connecting structure 11 includes a recessed structure in the shape of a dovetail groove and the second connecting structure 22 includes a protruding structure in the shape of a dovetail table.

The dovetail table is a special prismatic structure, the cross-section of which is in the shape of an isosceles trapezoid. The angle $\alpha$ is an angle between the bottom edge and a sidewall of the isosceles trapezoid.

In some embodiments, in the case that the first connecting structure 11 includes a recessed structure, the recessed structure passes through the support strip or does not pass through the support strip.

Figure 7:
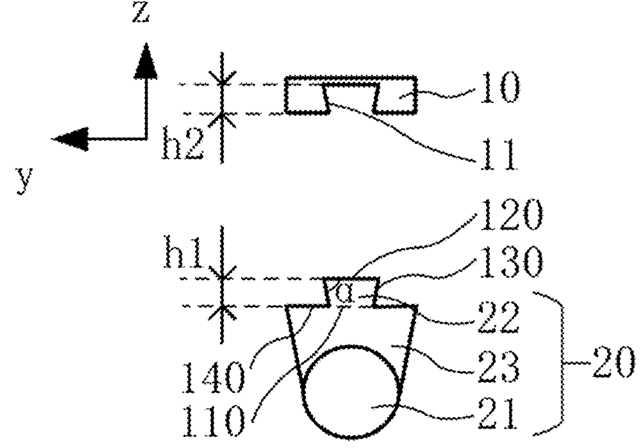
FIG. 7 is a side view of the first support member shown in FIG. 6.

FIG. 7 is a side view of the first support member shown in FIG. 6. In combination with FIG. 6 and FIG. 7, similarly, the angle $\alpha$ between the second surface 120 and the sidewall 130 of the protruding structure ranges from 100 to 80°, e.g., 300 to 60°. The angle $\alpha$ is set to increase the bonding force between the protruding structure and the recessed structure.

In the embodiments of the present disclosure, as shown in FIG. 5 and FIG. 7, the dimension h1 of the protruding structure in the thickness direction z of the support strip 10 ranges from 0.1 mm to 1 mm, and the dimension h2 of the recessed structure in the thickness direction z of the support strip 10 ranges from 0.1 mm to 1 mm, e.g., 0.1 mm, 0.5 mm, 0.8 mm, and 1 mm.

The protruding structure and the recessed structure are set to have such dimensions to ensure the connecting strength of the support strip and the sliding part under the premise that the overall volume of the display device is not affected.

Figure 8:
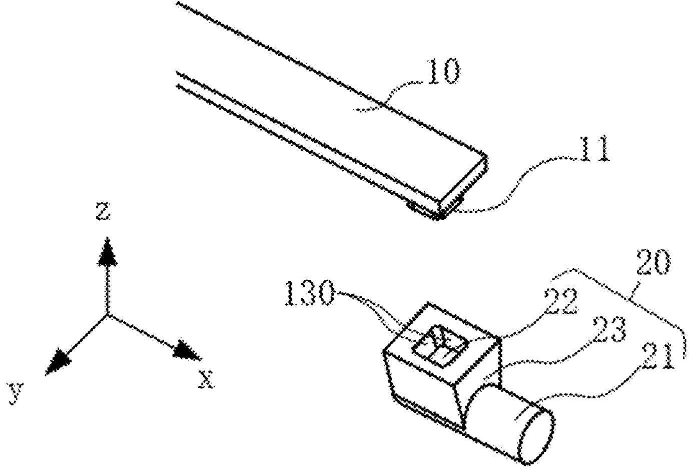
FIG. 8 is a schematic structural diagram of still another first support member according to some embodiments of the present disclosure.

FIG. 8 is a schematic structural diagram of still another first support member according to some embodiments of the present disclosure. The first support member shown in FIG. 8 differs from the support member shown in FIG. 4 in that the first connecting structure 11 includes a protruding structure in the shape of a truncated pyramid and the second connecting structure 22 includes a recessed structure.

Figure 9:
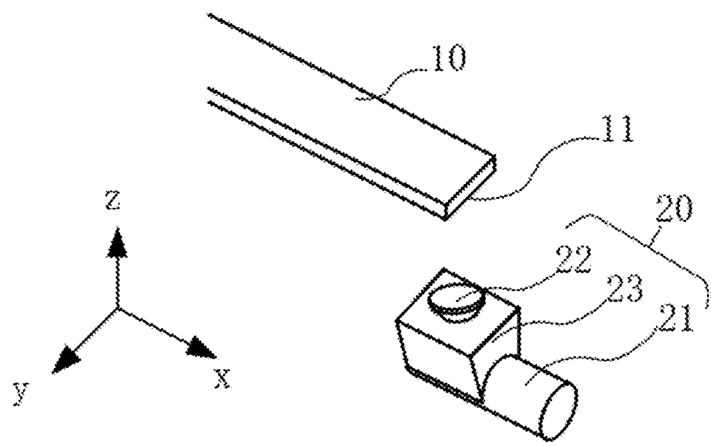
FIG. 9 is a schematic structural diagram of still another first support member according to some embodiments of the present disclosure.

FIG. 9 is a schematic structural diagram of still another first support member according to some embodiments of the present disclosure. The first support member shown in FIG. 9 differs from the support member shown in FIG. 4 in that the second connecting structure 22 includes a protruding structure in the shape of a circular truncated cone and the first connecting structure 11 includes a recessed structure.

It should be noted that, in the embodiments shown in FIG. 8 and FIG. 9, the positions of the protruding structure and the recessed structure is exchangeable, that is, the first connecting structure 11 includes a recessed structure and the second connecting structure 22 includes a protruding structure.

FIG. 4 to FIG. 9 are exemplarily illustrated by taking an example in which the first connecting structure 11 and the second connecting structure 22 include one protruding structure or recessed structure. In other embodiments, the number of the protruding structures and the number of the recessed structures may be set based on needs, for example, two, three, or the like.

In the case that a plurality of protruding structures or a plurality of recessed structures are provided, the plurality of protruding structures are of the same shape and have the same dimension. For example, in the support member shown in FIG. 10, the second connecting structure 22 includes two protruding structures in the shape of a cylinder, and the first connecting structure 11 includes two recessed structures.

Alternatively, in the case that a plurality of protruding structures or a plurality of recessed structures are provided, the plurality of protruding structures are of different shapes. For example, in the support member shown in FIG. 11, the second connecting structure 22 includes two protruding structures, which are in the shape of a cylinder and a circular truncated cone, respectively, and the first connecting structure 11 includes two recessed structures.

In other possible implementations, the first connecting structure 11 includes at least one protruding structure and at least one recessed structure, and the second connecting structure 22 includes the corresponding at least one recessed structure and at least one protruding structure.

Figure 10:
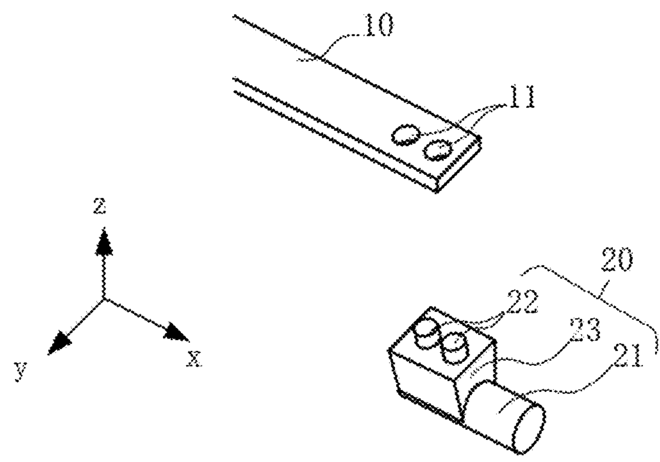
FIG. 10 is a schematic structural diagram of still another first support member according to some embodiments of the present disclosure.
Figure 11:
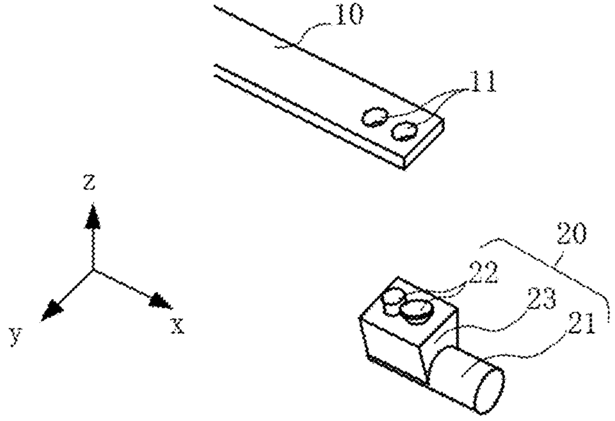
FIG. 11 is a schematic structural diagram of still another first support member according to some embodiments of the present disclosure.

In the embodiments of the present disclosure, the protruding structure is a dovetail table (as shown in FIG. 4 and FIG. 6), a truncated pyramid (as shown in FIG. 8), a circular truncated cone (as shown in FIG. 9 and FIG. 11), a cylinder (as shown in FIG. 10 and FIG. 11) or other prisms. The center line of the protruding structure is perpendicular to the length direction x of the support strip 10 and the width direction y of the support strip 10. The protruding structures of these shapes can increase the bonding force between the protruding structure and the recessed structure. Therefore, the bonding between the protruding structure and the recessed structure is more reliable, and the support strip and the sliding part are not easy to separate from each other.

The shape of the protruding structure is not limited in the embodiments of the present disclosure, and may be selected based on actual needs. For example, the protruding structure is in the shape of a prism, or the like.

In some embodiments, the protruding structure has a plurality of sidewalls, and the plurality of sidewalls are smoothly connected. As shown in FIG. 8, the protruding structure is in the shape of a truncated pyramid, and the sidewalls 130 are smoothly connected.

In the embodiments of the present disclosure, in the case that a plurality of protruding structures and a plurality of recessed structures, the plurality of protruding structures are spaced apart in the length direction x of the support strip 10, and the distance between two adjacent protruding structures is greater than or equal to 0.2 mm. In the length direction x of the support strip and the width direction y of the support strip, the plurality of protruding structures are disposed within the range of the sliding base 23. As shown in FIG. 10 or FIG. 11, two protruding structures are spaced apart in the length direction x of the support strip.

Figure 12:
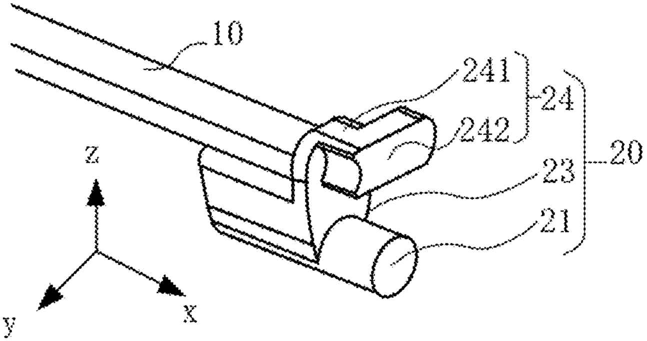
FIG. 12 is a schematic structural diagram of a first support member including a limiting member according to some embodiments of the present disclosure.

FIG. 12 is a schematic structural diagram of a first support member including a limiting member according to some embodiments of the present disclosure. As shown in FIG. 12, the sliding part 20 further includes a limiting member 24. The limiting member 24 includes a connecting portion 241 and a sliding portion 242, and the connecting portion 241 connects the sliding portion 242 to the sliding base 23 to fix the limiting member 24 on the sliding base 23. In the width direction y of the support strip 10, two ends of the sliding portion 242 of the limiting member 24 are in the shape of an arc that is bent towards the same direction.

In combination with FIG. 2, in the support structure including a plurality of first support members 1*a*, the limiting member 24 is configured to limit the movement of the first support members 1*a* in the width direction y of the support strip 10. In the length direction x of the support strip 10, the limiting member 24 and the columnar projection 21 are disposed on the same side of the sliding base 23.

Figure 13:
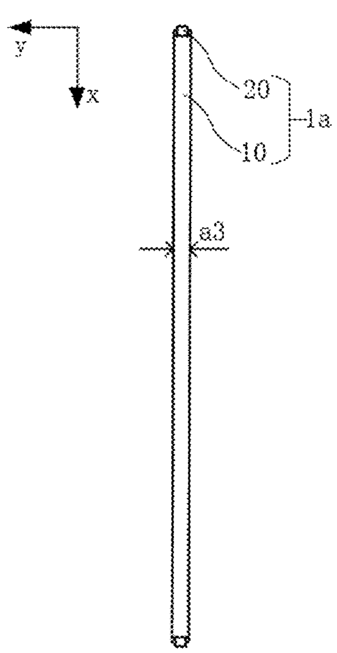
FIG. 13 is a top view of a first support member according to some embodiments of the present disclosure.

FIG. 13 is a top view of a first support member according to some embodiments of the present disclosure. As shown in FIG. 13, the support strip 10 is a plate-like structure in the shape of a long strip, and the support strip 10 has no hollowed-out structures.

In the embodiments of the present disclosure, at least one of the support strip 10 and the sliding part 20 is made of a non-metal material, that is, at least one of the support strip 10 and the sliding part 20 is non-metal structure member. In the relate art, the support strip and the sliding part are both made of a metal material, and the support member is heavy. Since the density of the non-metal material is less than the density of the metal material, the weight of the support member can be reduced, which facilitates the portability and use of the display device.

Exemplarily, the support strip 10 is made of a carbon fiber material, and the support strip 10 is a carbon fiber structure member. The density of the carbon fiber material is less than the density of the metal material, which can greatly reduce the weight of the support strip.

Exemplarily, the support strip 10 includes at least three carbon fiber material layers that are sequentially stacked, and two adjacent carbon fiber material layers of the at least three carbon fiber material layers have different carbon fiber direction orientations. Adjacent carbon fiber material layers having different carbon fiber direction orientations can meet the requirement on the strength of the support strip.

Exemplarily, in the at least three carbon fiber material layers, the carbon fiber direction orientation of a carbon fiber material layer disposed in an odd number layer is a first carbon fiber direction orientation, the carbon fiber direction orientation of a carbon fiber material layer disposed in an even number layer is a second carbon fiber direction orientation, and the first carbon fiber direction orientation and the second carbon fiber direction orientation intersect, which can increase the strength of the support strip as much as possible.

Exemplarily, the support strip 10 includes at least three carbon fiber material layers that are sequentially stacked, and the first carbon fiber direction orientation and the second carbon fiber direction orientation are perpendicular to each other, which can increase the strength of the support strip as much as possible.

In some embodiments, the sliding part 20 is made of metal, a resin material, or plastic, that is, the sliding part 20 is a metal structure member, a resin structure member, or a plastic structure member. When the sliding part 20 is made of such materials, sufficient hardness of the sliding part 20 can be ensured, which can facilitate the matching between the sliding part 20 and the sliding rail.

Exemplarily, in the case that the support strip is made of the carbon fiber material, the first connecting structure 11 is a protruding structure, and the second connecting structure 22 is a recessed structure, the filling rate of resin in the recessed structure is greater than 90%, which can increase the bonding force between the first connecting structure and the second connecting structure. The recessed structure made of the resin material has bubbles therein, and the filling ratio here is the ratio of the volume of the resin material to the total volume of the resin material and the bubbles. The second connecting structure here is also referred to as a glue-gripping structure, and the "glue" refers to the resin in the carbon fiber material.

The support strip 10 is made of the carbon fiber material (with a density of 1.78 g), the sliding part 20 is made of stainless steel (sus316), and the support strip 10 and the sliding part 20 are connected by means of carbon fiber hot pressing, thereby forming the support member, and this support member is compared with a support member totally made of stainless steel (sus316). The mass of the support member in the embodiments of the present disclosure is reduced by 71%, which greatly reduces the weight of the support structure. In addition, a drawing force test is conducted on the support member provided in the embodiments of the present disclosure, and the support member can withstand a drawing force of more than 1 kgf. It can be seen that the connection between the support strip 10 and the sliding part 20 is reliable.

Exemplarily, as shown in FIG. 13, the width a3 of the support strip 10 ranges from 0.5 mm to 100 mm. The support strip having such a width ensures that the support strip can provide sufficient support. Here, the width a3 of the support strip 10 is less than or equal to 100 mm, and the support strip 10 is more suitable for application to small-sized mobile terminal products. When the support strip 10 is applied to large-sized products, the width a3 of the support strip 10 is larger and is not limited to be less than or equal to 100 mm.

Exemplarily, referring to FIG. 3 again, in the support structure, the ratio of the distance a4 between two adjacent support strips 10 to the width a3 of the support strip 10 ranges from 0.5 to 1.5, e.g., 0.8 to 1.2. Exemplarily, the ratio of the distance a4 between two adjacent support strips 10 to the width a3 of the support strip 10 is 0.9, 1.0, or 1.1.

Figure 14:
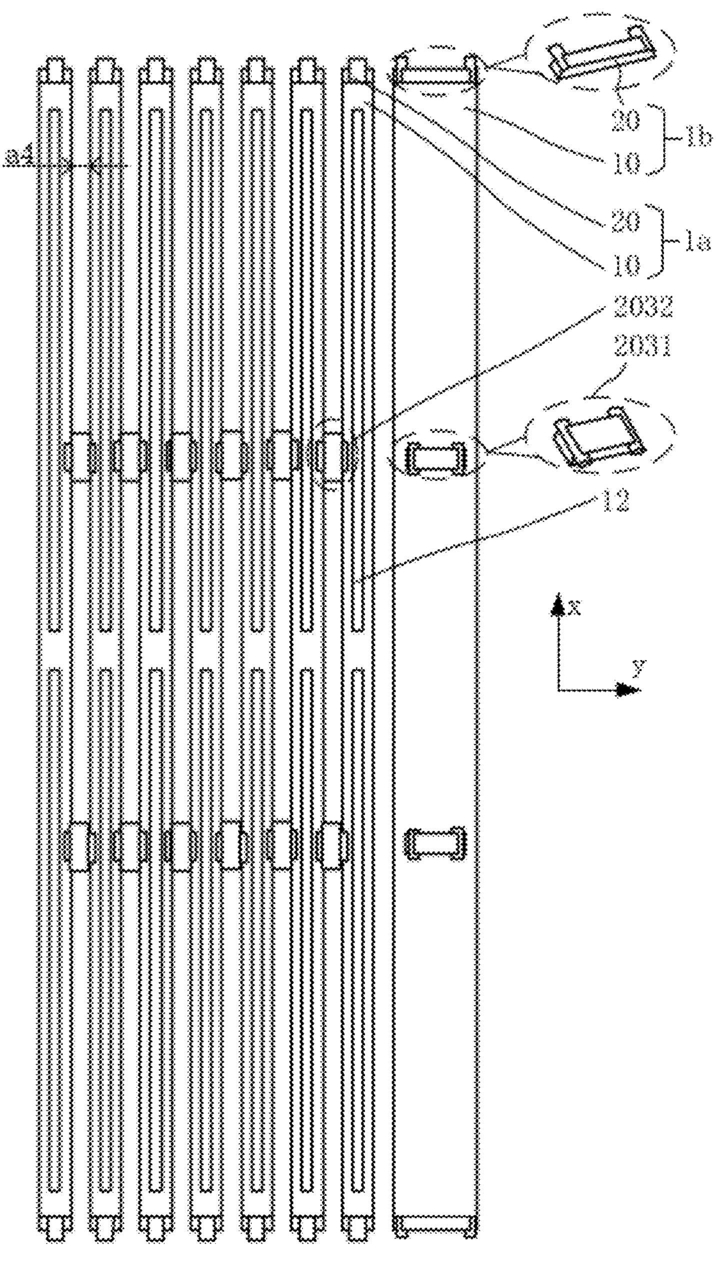
FIG. 14 is a plane view of another support structure according to some embodiments of the present disclosure.

FIG. 14 is a plane view of another support structure according to some embodiments of the present disclosure. As shown in FIG. 14, the support structure shown in FIG. 14 differs from the support structure shown in FIG. 3 in that the support strip 10 in FIG. 14 is provided with at least two strip grooves 12, the strip groove 12 passes through the support strip 10 in the thickness direction z of the support strip 10, the length direction of the strip groove 12 is the same as the length direction x of the support strip 10, and the at least two strip grooves 12 are arranged along the length direction x of the support strip 10. The strip grooves are provided to further reduce the weight of the support member.

Exemplarily, the length of the strip groove 12 is less than a half of the length of the support strip 10 and is greater than 0. The strip groove 12 having such a length range can reduce the weight of the support strip, and meanwhile, the support strip 10 will not be insufficiently supportive during use because the sliding groove is too long to result in bending, deformation and the like, thereby ensuring the display effect of the display device.

In some embodiments, the width of the strip groove 12 is greater than 0.2 mm and less than the width of the support strip 10.

Exemplarily, as shown in FIG. 3 and FIG. 14, the support structure further includes a second support member 1*b*. The width of the support strip 10 of the second support member 1*b* is greater than the width of the support strip 10 of the first support member 1*a*. Other features of the second support member 1*b* are substantially the same as those of the first support member. The second support member 1*b* is arranged in parallel with the plurality of first support members 1*a*, and the second support member 1*b* is disposed on a side of the plurality of first support members 1*a* in the arrangement direction of the plurality of first support members 1*a*. In combination with FIG. 1, the wider second support member 1*b* does not run through the scroll 200 into the planar display portion 101 of the flexible display panel 10, and can play a limiting function.

Exemplarily, the support structure further includes a plurality of first support parts 2031. At least one first support part 2031 is disposed on the sides, away from the flexible display panel 100, of at least some of the support strips 10, and the at least one first support part 2031 connected to the same support strip 10 is symmetrical about a center line of the support strip 10, and the center line is perpendicular to the length direction x of the support strip 10. For example, the support strip 10 of the second support member 1*b* is connected to at least one first support part 2031, and the support strip 10 of the first support member 1*a* is not connected to any first support part 2031.

Exemplarily, the support structure further includes a plurality of second support parts 2032, at least one second support part 2032 is disposed between two adjacent support strips 10, the at least one second support part 2032 between two adjacent support strips 10 is symmetrical about a center line of the support strip 10. The center line is perpendicular to the length direction x of the support strip 10.

In some embodiments, the number of the first support parts 2031 connected to the same support strip 10 is equal to the number of the second support parts 2032 connected between two support strips 10.

The first support part 2031 or the second support part 2032 includes a connecting base and a columnar structure. The connecting base of the second support part 2032 is connected to two adjacent support strips 10, the columnar structure of the second support part 2032 is connected to the connecting base of the second support part 2032, and in the length direction of the support strip 10, the columnar structure of the second support part 2032 protrudes from the connecting base where it is disposed. The connecting base of the first support part 2031 is connected to the side of the support strip 10 away from the flexible display panel, the columnar structure of the first support part 2031 is connected to the connecting base of the first support part 2031, and in the length direction of the support strip 10, the columnar structure of the first support part 2031 protrudes from the connecting base where it is disposed.

Accordingly, another sliding rail is provided in the display device, and this sliding rail cooperates with the columnar structure of the support part.

In a possible implementation, in the support structure, the second support part 2032 is disposed between two adjacent support strips which are not provided with strip grooves, and the second support part 2032 is provided to improve the support force of the middles of the support strips, so as to prevent the flexible display from the problems of deformation such as bending and the like as far as possible, thereby ensuring the display effect.

In another possible implementation, as shown in FIG. 14, two second support parts 2032 are disposed between two adjacent support strips 10 of the first support member 1*a* which are provided with the strip grooves 12, and two first support parts 2031 are disposed on the side of the support strip 10 of the second support member 1*b* away from the flexible display panel. Compared with the support strip without the strip groove, the middle of the support strip 10 with the strip groove 12 may be insufficiently supportive, resulting in deformation such as bending of the flexible display panel. The second support part 2032 can improve the support force of the middle of the support strip including the strip groove, thereby improving the display effect.

As described above, for the first support part 2031 and the second support part 2032, in a display device, there may be only the first support part 2031 (as shown in FIG. 3), or there may be both the first support part 2031 and the second support part 2032 (as shown in FIG. 14). In other possible implementations, only the second support part 2032 is provided in a display device. The provision of the first support part or the second support part can improve the support force of the middle of the support strip, and avoid as much as possible the problem of deformation such as bending of the flexible display, thereby ensuring the display effect.

Figure 15:
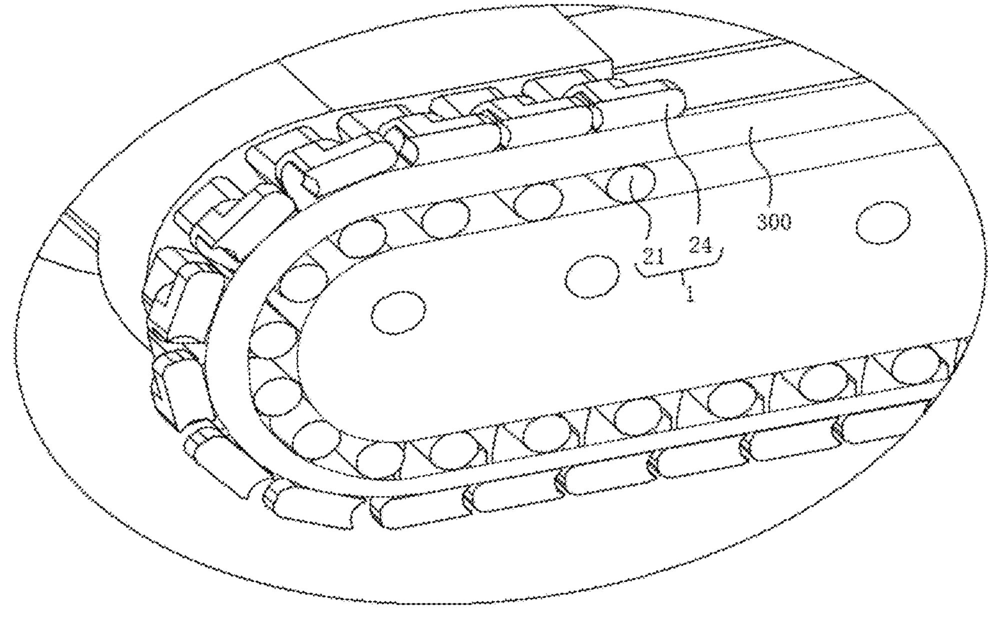
FIG. 15 is a schematic diagram of a structure in a region close to a scroll of a display device according to some embodiments of the present disclosure.

FIG. 15 is a schematic diagram of a structure in a region close to a scroll of a display device according to some embodiments of the present disclosure. In combination with FIG. 14 and FIG. 15, two ends of the first support member 1*a* and two ends of the second support member 1*b* are lapped on a guide rail 300, and the first support member 1*a* and the second support member 1*b* slide along the guide rail 300, thereby matching the unfolded state and the contracted state of the flexible display panel 100. The columnar projection 21 of the first support member 1*a* and the columnar projection 21 of the second support member 1*b* slidably cooperate with the guide rail 300.

Figure 16:
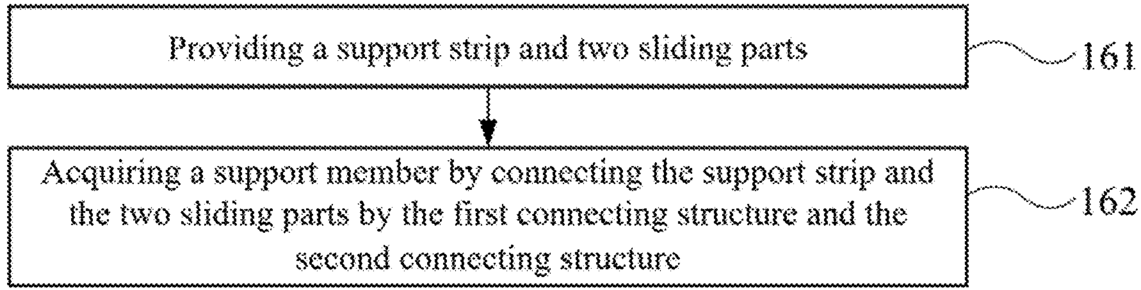
FIG. 16 is a flowchart of a method for manufacturing a support member according to some embodiments of the present disclosure.

FIG. 16 is a flowchart of a method for manufacturing a support member according to some embodiments of the present disclosure. As shown in FIG. 16, the method for manufacturing the support member includes the following steps.

In step 161, a support strip and two sliding parts are provided.

A first connecting structure is disposed at each of the two ends of the support strip, the sliding part includes a second connecting structure, and the first connecting structure and the second connecting structure are recessed and protruding structures matching each other.

In step 162, a support member is acquired by connecting the support strip and the two sliding parts by the first connecting structure and the second connecting structure.

At least a portion of the sliding part extends beyond the support strip in a length direction of the support strip.

The support member acquired in step 162 is the first support member 1*a* or the second support member 1*b* mentioned above.

In a possible implementation, the support strip and the sliding parts are connected by a hot pressing molding process. The support strip is made of a carbon fiber material, and the carbon fiber material of the support strip includes resin. The sliding parts are made of a metal material, or the sliding parts are made of a non-metal material having a melting point higher than the melting point of the resin in the support strip.

In another possible implementation, the support strip and the sliding parts are connected by a hot melting molding process. The support strip is made of a carbon fiber material, and the carbon fiber material of the support strip includes resin. The sliding parts are made of a non-metal material having a melting point that is not higher than the melting point of the resin in the support strip.

The embodiments of the present disclosure further provide a support member, and two ends of the support member are lapped on a guide rail.

The support member includes a support strip and two sliding parts. The two sliding parts are respectively disposed at two ends of the support strip, and at least a portion of each of the sliding parts extends beyond the support strip in the length direction of the support strip. The support strip and the sliding parts are made of different materials. A first connecting structure is disposed at each of the two ends of the support strip, and the sliding part includes a second connecting structure. The first connecting structure and the second connecting structure are recessed and protruding structures matching each other, and the support strip and the sliding parts are connected by the first connecting structure and the second connecting structure.

For the other structures of the support strip and the sliding parts, please refer to the foregoing embodiments, which are not repeated herein.

Described above are merely optional embodiments of the present disclosure, and are not intended to limit the present disclosure. Within the spirit and principles of the present disclosure, any modifications, equivalent substitutions, improvements, and the like are within the protection scope of the present disclosure.

The invention claimed is:

1. A display device, comprising: a flexible display panel and a support structure, the flexible display panel being disposed on a side of the support structure, and the support structure comprising a plurality of support members arranged in parallel; wherein the support member comprises a support strip and two sliding parts; wherein the two sliding parts are respectively disposed at two ends of the support strip, and at least a portion of the sliding part extends beyond the support strip in a length direction of the support strip;

the support strip and the sliding parts are made of different materials; and a first connecting structure is disposed at each of two ends of the support strip, and the sliding part includes a second connecting structure;

wherein the first connecting structure and the second connecting structure are recessed and protruding structures matching each other, and the support strip and the sliding part are connected by the first connecting structure and the second connecting structure.

2. The display device according to claim 1, wherein one of the first connecting structure and the second connecting structure comprises N protruding structures, and the other one of the first connecting structure and the second connecting structure comprises N recessed structures, wherein N is a positive integer.

3. The display device according to claim 2, wherein the protruding structure is a cylinder, a truncated pyramid, a circular truncated cone, a dovetail table, or a truncated pyramid, and a center line of the protruding structure is perpendicular to the length direction of the support strip and a width direction of the support strip.

4. The display device according to claim 2, wherein the protruding structure has a first surface and a second surface opposite to each other and a sidewall connecting the first surface and the second surface; wherein the first surface is connected to a bearing surface of the protruding structure, and an angle between the second surface and the sidewall ranges from 10° to 80°.

5. The display device according to claim 2, wherein a dimension of the protruding structure in a thickness direction of the support strip ranges from 0.1 mm to 1 mm; and a dimension of the recessed structure in the thickness direction of the support strip ranges from 0.1 mm to 1 mm.

6. The display device according to claim 2, wherein N is greater than 1, and the N protruding structures are spaced apart in the length direction of the support strip, and a distance between two adjacent protruding structures of the N protruding structures is greater than or equal to 0.2 mm.

7. The display device according to claim 6, wherein the N protruding structures are of the same shape; or at least two protruding structures of the N protruding structures are of different shapes.

8. The display device according to claim 1, wherein the sliding part comprises a sliding base and a columnar protrusion; wherein an orthographic projection of the sliding base on a first surface of the support strip is within the first surface of the support strip, the first surface of the support strip being a surface on which the first connecting structure is located; and in the length direction of the support strip, the columnar protrusion is disposed on a side of the sliding base away from the support strip.

9. The display device according to claim 8, wherein a dimension of the sliding base in the length direction of the support strip ranges from 0.3 mm to 3 mm; and a ratio of a dimension of the sliding base in a width direction of the support strip to a width of the support strip ranges from 0.5 to 1.5.

10. The display device according to claim 8, wherein the sliding part further comprises a limiting member, the limiting member being configured to limit movement of the support member in the width direction of the support strip; wherein in the length direction of the support strip, the limiting member and the columnar protrusion are disposed on a same side of the sliding base.

11. The display device according to claim 1, wherein the support strip is a non-hollowed-out structure; or the support strip is provided with at least two strip grooves, wherein the strip groove passes through the support strip in a thickness direction of the support strip, a length direction of the strip groove is the same as the length direction of the support strip, and the at least two strip grooves are arranged along the length direction of the support strip.

12. The display device according to claim 11, wherein a length of the strip groove is greater than 0 and is less than a half of a length of the support strip.

13. The display device according to claim 11, wherein a width of the support strip ranges from 0.5 mm to 100 mm.

14. The display device according to claim 1, wherein at least one of the support strip and the sliding part is a non-metal structure member.

15. The display device according to claim 14, wherein the support strip is a carbon fiber structure member, and the sliding part is a metal structure member, a resin structure member or a plastic structure member.

16. The display device according to claim 15, wherein the support strip comprises at least three carbon fiber material layers that are sequentially stacked, wherein two adjacent carbon fiber material layers of the at least three carbon fiber material layers have different carbon fiber direction orientations.

17. The display device according to claim 16, wherein in the at least three carbon fiber material layers, a carbon fiber direction orientation of a carbon fiber material layer disposed in an odd number layer is a first carbon fiber direction orientation, and a carbon fiber direction orientation of a carbon fiber material layer disposed in an even number layer is a second carbon fiber direction orientation, wherein the first carbon fiber direction orientation and the second carbon fiber direction orientation intersect.

18. The display device according to claim 1, wherein the plurality of support members comprise a plurality of first support members and one second support member; wherein in an arrangement direction of the plurality of first support members, the second support member is disposed on a side of the plurality of first support members; and a width of a support strip of the first support member is less than a width of a support strip of the second support member.

19. The display device according to claim 18, wherein the support structure further comprises a plurality of first support parts; wherein at least one of the plurality of first support parts is disposed on sides, away from the flexible display panel, of at least some of the support strips, and at least one of the plurality of first support parts connected to a same support strip is symmetric about a center line of the support strip, wherein the center line is perpendicular to the length direction of the support strip.

20. The display device according to claim 19, wherein the support structure further comprises a plurality of second support parts; wherein at least one of the plurality of second support parts is disposed between two adjacent support strips, and the at least one of the plurality of second support parts disposed between the two adjacent support strips is symmetric about a center line of the support strip, wherein the center line is perpendicular to the length direction of the support strip.

* * * * *